United States Patent [19]
Klass

[11] 3,707,750
[45] Jan. 2, 1973

[54] METHOD FOR MANUFACTURING A TURBINE BLADE

[75] Inventor: Georg Klass, Tuerkenfeld, Germany

[73] Assignee: Motoren-und Turbinen-Union Munchen GmbH, Munich, Germany

[22] Filed: Nov. 13, 1969

[21] Appl. No.: 876,256

[30] Foreign Application Priority Data

Nov. 14, 1968    Germany..................P 18 08 852.3

[52] U.S. Cl. ....................29/156.8 B, 29/156.8 H
[51] Int. Cl. ......B21k 3/04, B23p 15/02, B23p 15/04
[58] Field of Search....29/156.8 B, 156.8 H, 156.8 R, 29/156.8 T, 156.8 CP

[56] References Cited

UNITED STATES PATENTS

| | | | |
|---|---|---|---|
| 2,644,665 | 7/1953 | Cangemi | 29/156.8 H |
| 2,679,669 | 6/1954 | Kempe | 29/156.8 H |
| 2,687,278 | 8/1954 | Smith | 29/156.8 H |
| 2,787,049 | 4/1957 | Stalker | 29/156.8 H |
| 3,067,982 | 12/1962 | Wheeler | 29/156.8 H |
| 3,135,486 | 6/1964 | Wing | 29/156.8 H |
| 2,946,681 | 7/1960 | Probst | 29/156.8 H |

FOREIGN PATENTS OR APPLICATIONS

| | | | |
|---|---|---|---|
| 811,586 | 4/1959 | Great Britain | 29/156.8 H |
| 852,826 | 11/1960 | Great Britain | 29/156.8 H |
| 1,419,461 | 10/1965 | France | 29/156.8 H |
| 651,117 | 3/1951 | Great Britain | 29/156.8 H |
| 786,727 | 11/1957 | Great Britain | 29/156.8 H |

Primary Examiner—John F. Campbell
Assistant Examiner—Donald P. Rooney
Attorney—Craig, Antonelli & Hill

[57] ABSTRACT

A method for manufacturing a turbine blade in which a sheet metal strip, corresponding in its dimensions to the developed blade, is provided with cooling passages, thereafter a thinner sheet metal strip is attached to the sheet metal strip provided with the grooves by welding or brazing to form a blade wall, and thereafter the blade wall is placed about a tool core and is deformed into the shape of the blade whereupon the ends of the strips are connected with each other by brazing or welding to form the trailing edge of the blade.

17 Claims, 12 Drawing Figures

PATENTED JAN 2 1973
3,707,750
SHEET 1 OF 2
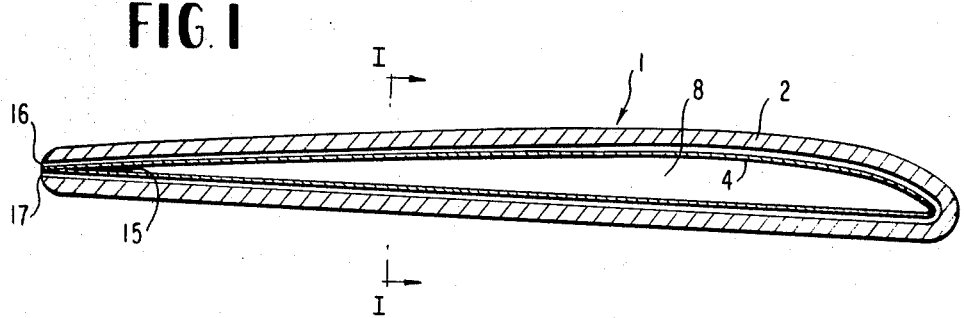
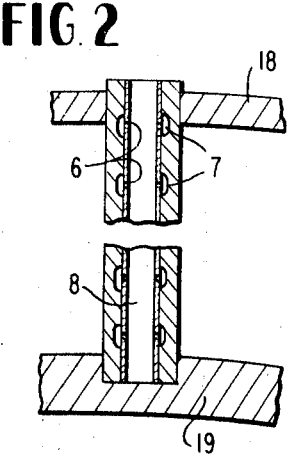
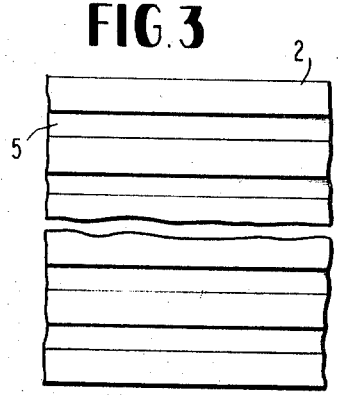
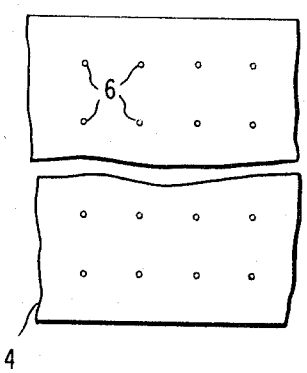
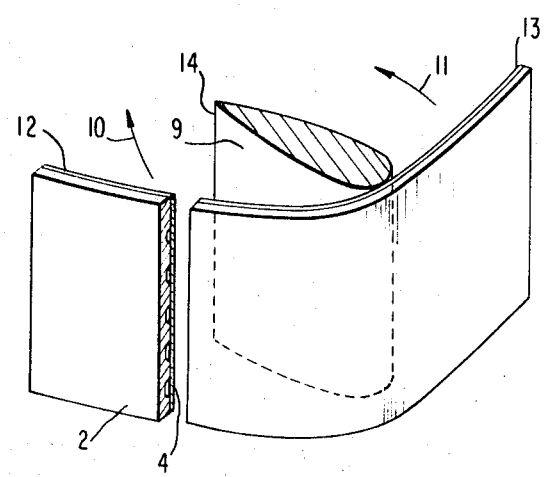
INVENTOR
GEORG KLASS
BY
Craig, Antonelli, Stewart & Hill
ATTORNEYS

INVENTOR
GEORG KLASS

BY Craig, Antonelli, Stewart & Hill
ATTORNEYS

METHOD FOR MANUFACTURING A TURBINE BLADE

The present invention relates to a method for the manufacture of a turbine blade, especially of a guide blade which, for purposes of cooling of the blade walls by means of a cooling medium is constructed hollow on the inside and is provided on the inside of the blade walls with cooling channels or passages extending in the axial or radial direction which are adapted to be fed from the outside or by way of the hollow space of the blade with cooling medium that is discharged by way of one or several openings located at the trailing edge of the blade.

Known in the prior art are cast, forged and rolled blades, in which the cooling channels or passages are established during the manufacturing process or subsequently thereto. Furthermore, hollow-cast blades are known and also blades made from sheet metal. These prior art blades have so-called cooling inserts, into which are machined the cooling medium passages in the form of grooves. In the assembled condition of the hollow blade and cooling insert, the grooves form cooling medium passages. The cooling medium passage in the blade may thereby be constructed in different ways. The channels or passages may extend in the radial direction. This type of construction is preferred with cast and forged blades. Another possibility resides in designing the channels to follow the form of a helix in the radial direction. This arrangement normally requires a hollow blade with cooling insert as is also required by the axial arrangement of the channels. All of these types of construction entail the disadvantage that they require high expenditures and extensive efforts during the manufacture and that a sufficient cooling of the particularly highly stressed trailing edge of the blade is not possible since one is not able on the basis of the manufacturing methods known heretofore to provide such cooling channels within the area of the thin trailing edge which is subjected to particularly high temperature stresses. This is also true in connection with hollow blades having a cooling insert. With axially extending cooling medium passages, the same are conducted laterally toward the outside in front of the trailing edge of the blade.

The present invention aims at creating a manufacturing method for a cooled turbine blade which compared to the hitherto known blade manufacturing methods, requires a considerably smaller effort and expenditure for the manufacture of such a blade whereby simultaneously by the use of this manufacturing method, a turbine blade is to be produced with a location and arrangement of its cooling channels or passages resulting from such method as assure a particularly intensive cooling of the leading and trailing edges of the blade, which are endangered in particular by thermal stresses, as well as a uniform temperature of the blade wall.

As solution to the underlying problems, the present invention proposes a method for the manufacture of a cooled turbine blade which is characterized in that at first a sheet metal strip is prepared for the blade walls in the form of the developed blade, whereupon, for the formation of the cooling passages or channels, grooves are machined or formed into this sheet metal strip, and thereafter a further thin sheet metal strip of the same or of substantially the same size is attached by brazing or welding to the sheet metal strip provided with the grooves whereupon the blade wall thus produced and provided with cooling channels or passages, is placed around a tool core for the manufacture of the desired blade profile by means of a fixture, and more particularly in such a manner that the two ends of the blade wall formed by the sheet metal strips abut against one another for achieving the trailing edge of the blade and subsequently are brazed or welded to one another at this location, i.e., at these interfaces.

On the basis of this method of manufacture of a cooled turbine blade, all of the cooling channels or passages are arranged already after the deformation operation at the places required for the cooling of the blade wall. It is thereby particularly advantageous that the cooling channels or passages are formed already prior to the deformation of the sheet metal wall by grooves, for example, milled into the same, of which two or more, disposed opposite one another after completion of the deformation of the sheet metal wall of the blade, form one or several common cooling channels or passages which may be preferably used for an intensive cooling of the trailing edge of the blade.

With the previously known cooling inserts having, for example, a corrugated surface or having a surface provided with grooves extending in an axial or radial direction in any other manner, or in case of cooling inserts provided with cooling-air bores in the cooling walls thereof, it will not be possible to place the cooling passages close to the leading and trailing edges of the blade which are subject to extreme temperature stresses as can be accomplished by means of the manufacturing method in accordance with the present invention.

It is thus further advantageous in the manufacturing method proposed by the present invention that compared with known cooled blades, a cooling insert provided with cooling passages or with a profiled surface for the formation of cooling passages need not be manufactured.

According to a further feature of the present invention, at first only the sheet metal strip provided with grooves may be deformed as blade wall corresponding to the desired blade profile, and thereafter the thinner sheet metal strip may be brazed or welded to the blade wall as an insert adapted to the inner contour of the blade.

Insofar as the cooling passages are to be supplied with cooling air from the inside of the blade, it would furthermore be appropriate according to the present invention if the thinner sheet metal strip is provided with bores already prior to its welding or brazing to the sheet metal strip provided with the grooves, which bores enable the cooling air supply from the interior hollow space or cavity of the blade to the cooling passages formed by the grooves.

These cooling air bores may be arranged distributed either uniformly or non-uniformly over the cross section of the thinner sheet metal strip for the purpose of achieving a uniform blade-wall temperature corresponding to the existing requirements. For an intensive, localized cooling, for example, of the blade leading edge, relatively large openings would be provided for this purpose within the area of the thinner sheet metal strip associated with this edge.

According to a further characteristic of the present invention, the thinner sheet metal strip may be shorter than the sheet metal strip provided with the grooves to form the blade wall so that with the use of radial grooves machined or worked into the inside of the blade wall and after completed deformation of both sheet metal strips, the ends of the thinner sheet metal strip terminate in front of one or several of the cooling passages formed by the grooves of the blade wall and are welded or brazed together at that place.

By the use of this feature, the blade may be constructed with a thin trailing edge notwithstanding the presence of cooling passages.

In a further type of construction of the present invention, in which grooves are used that are worked into the sheet metal strip, forming the blade wall, in the axial direction, these grooves may be so arranged one above the other extending only section-wise over this sheet metal strip that after completed deformation of this sheet metal strip corresponding to the desired blade contour, these grooves are located within the area of the leading or trailing edge of the blade whereby thin sheet metal strips in lengths according to the axial extension of the grooves, are attached for the purpose of forming the cooling channels to the respective sections provided with the grooves of the sheet metal strip serving to form the blade wall either before or after the deformation.

In order to facilitate the manufacture of cooled blades, which are provided with cooling passages only in sections, the present invention further proposes that one or several shorter sheet metal strips, serving the purpose of covering the grooves arranged section-wise in the sheet metal strips of the blade wall, be attached to these strips with their upwardly bent ends extending approximately parallel to the two lateral edges of the sheet metal strip provided with the grooves, in such a manner that after completed deformation, the upwardly bent ends of one or several shorter sheet metal strips overlap whereupon they are welded or brazed together.

Furthermore, in order to achieve a slender trailing edge of the blade as well as a trailing edge of the blade that is intensively cooled in service, with the use of grooves that extend in a radial or axial direction, the thinner sheet metal strip used for covering the grooves and therewith contributing to the formation of the cooling passages can be made shorter, according to the present invention, as compared to the sheet metal strips provided with the grooves, by such an amount that after completed deformation of both sheet metal strips corresponding to the desired blade contour, one or several grooves form together one or several cooling passages with bores or slots within the area of the trailing edge of the blade whereby these bores or slots, serving for the discharge of the cooling air out of the cooling passages by way of the trailing edge of the blade, can be machined or worked into the blade wall simultaneously with the grooves and prior to the deformation of the blade wall.

These and further objects, features, and advantages of the present invention, will become more obvious from the following description when taken in connection with the accompanying drawing which shows, for purposes of illustration only, several embodiments in accordance with the present invention, and wherein:

FIG. 1 is a cross-sectional view through a first embodiment of a turbine blade made in accordance with the present invention;

FIG. 2 is a cross-sectional view, taken along line I—I of FIG. 1;

FIG. 3 is a partial plan view of a first sheet metal strip provided with grooves and used for forming the blade wall of a turbine blade according to FIG. 1;

FIG. 4 is a partial plan view of a thin sheet metal strip provided with bores and used for forming the inner walls of the turbine blade according to FIG. 1;

FIG. 5 is a schematic view illustrating the manufacturing method in accordance with the present invention;

Figure 6:
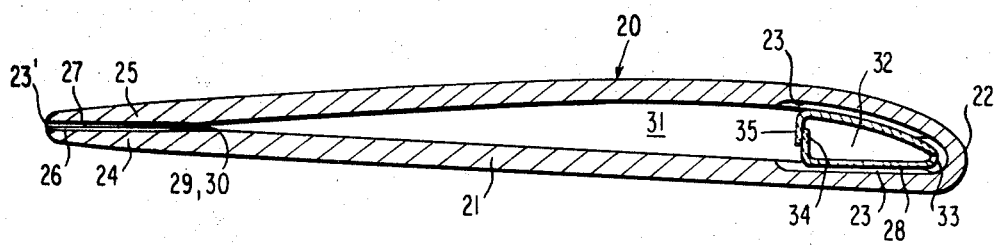
FIG. 6 is a cross-sectional view of a second embodiment of a turbine blade made in accordance with the present invention.

Referring now to the drawing wherein like reference numerals are used throughout the various views to designate like parts, the turbine blade generally designated by reference numeral 1 essentially consists of the sheet metal strips 2 and 4 (FIGS 3 and 4), which are illustrated in these two figures only in part, with the ends thereof broken away; in practice, the sheet metal strips 2 and 4 correspond in the dimensions thereof to the dimensions of the developed turbine blade according to FIG. 1.

One proceeds for the manufacture of the turbine blade illustrated in FIG. 1 in the following manner:

The sheet metal strip 2 cut to the finished dimensions of the turbine blade is provided with grooves 5. These grooves 5 may be either stamped, embossed or milled into the sheet metal strip 2. The sheet metal strip 4, of the same size as the sheet metal strip 2 but considerably thinner and already provided with bores 6, is mounted over the sheet metal strip 2 and more particularly in such a manner that both sheet metal strips are aligned. The sheet metal strip 4 is subsequently secured at the sheet metal strip 2 by brazing or welding. Assembled in the described manner and as can be seen also in longitudinal cross section from FIG. 5, the two strips 2 and 4 contain the cooling passages 7 of the finished blade 1 already prior to the deformation thereof (FIG. 2). The bores 6 are thereby aligned with the grooves 5 in order to assure a cooling medium supply of the cooling channels 7 by way of the hollow space or cavity 8 of the blade 1 when the turbine blade is completed.

As can be seen schematically from FIG. 5, the blade wall formed by the sheet metal strips 2 and 4 and provided with cooling passages 7, is placed about a tool core 9, whose shape and dimensions are matched to the shape and the dimensions of the hollow space or cavity 8 of the turbine blade 1. The blade wall formed by the blade strips 2, 4 is thereby placed and bent about the tool core 9 in the direction of the arrows 10 and 11 in such a manner that the two ends 12 and 13 of the sheet metal strip 4 abut against one another to the rear of the edge 14 of the tool core 9. At this place 15 (FIG. 1), the ends 12 and 13 of the sheet metal strip 4 are brazed or welded together whereby the entire blade wall consisting of the strips 2 and 4 is securely kept together at the blade trailing edge.

With the use of the method described, it will be advantageous if the sheet metal strip 2 is provided with the grooves 5 already prior to the deformation operation and if the cooling passages 7 are available already prior to the deformation operation, by the attachment of the sheet metal strip 4 onto the strip 2. Owing to the present manufacturing method, the additional manufacture of a cooling insert provided with a surface having, for example, a groove-shaped or corrugated profile for the formation of the cooling passages can thus be dispensed with.

As can be seen from FIG. 1, it is further advantageous with the use of the described method for the manufacture of the turbine blade if the cooling passages 7 form along the entire trailing edge of the blade discharge apertures 16, 17, after the blade is completed by welding or brazing together the ends 12 and 13 of the sheet metal strip 4 at the location 5, whereby these discharge apertures 16, 17 are used to discharge the cooling medium for the purpose of an intensive cooling of this trailing edge which is subjected to extreme temperature stresses in service.

As can be further seen from FIG. 2, the turbine blade 1 may be a stationary turbine guide blade whose shroud ring segments associated with the vane support are shown partially and designated by reference numerals 18 and 19.

Figure 7:
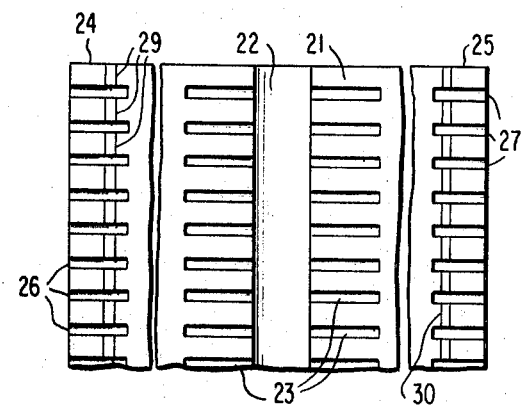
FIG. 7 is a partial plan view of a sheet metal strip provided with grooves for forming the blade wall associated with the turbine blade according to FIG. 6.

The embodiment of a cooled turbine blade 20 illustrated in FIG. 6 mainly differs from the embodiment according to FIGS. 1 and 2 in that the blade wall is formed almost exclusively by a single sheet metal strip 21 (FIG. 7). This embodiment is primarily intended to achieve an intensive cooling of the leading edge 22' and of the trailing edge 23' of the blade.

The sheet metal strip 21 has the size of the developed blade 20 and is provided in the center with a vertical groove 22, in which terminate transverse grooves 23 arranged one over the other. Furthermore, the sheet metal strip 21 is provided within the area of its two ends 24, 25 with transverse grooves 26 and 27 open toward the outside and arranged one over the other. A thin short sheet metal strip 28, provided laterally with upwardly bent ends 34, 35, is placed over the vertical groove 22 as well as the transverse grooves 23 and is brazed or welded together with the strip 21.

For the manufacture of the blade 20, the sheet metal strip 21 is placed about a tool core in the manner described already hereinabove according to the present invention. After the completed deformation operation, each two mutually opposite grooves 26 and 27 form the cooling passages with discharge apertures at the trailing edge 23' of the blade as a result of the abutment of the ends 24 and 25 of the strip 21.

The brazing joints 29, 30 for connecting together the ends 24, 25 of the strip 21 are located between the transverse grooves 26, 27 so that the cooling medium is able to flow off unimpairedly by way of the cooling passages formed by the transverse grooves 26 and 27 and therewith by way of the trailing edge 23' of the blade.

As can be further seen from FIG. 6, the sheet metal strip 28 placed over the groove 22 as well as over the transverse grooves 23 has been so deformed that it forms a separate insert with a separate hollow space or cavity 32 which is in communication by way of an aperture 33 of the sheet metal strip 28, extending in the longitudinal direction of the blade, with the groove 22 serving the purpose of cooling the blade leading edge 22 and supplying the cooling medium, as well as with the transverse grooves 23, from where the cooling medium reaches the hollow space or cavity 31 of the blade and from there reaches the trailing edge 23' of the blade.

Figure 8:
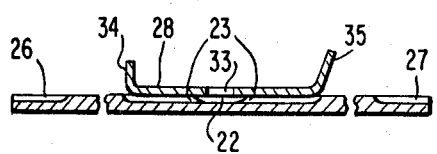
FIG. 8 is a cross-sectional view of the sheet metal strip shown in FIG. 7 with an additional thin sheet metal strip mounted over the grooves.

The ends 34, 35 of the sheet metal strip 28 are, according to FIG. 8, bent upwardly in such a manner that they overlap after completed deformation for achieving the blade cross section according to FIG. 6, whereupon these ends 34, 35 are brazed or welded together to complete the blade. It can be further seen from FIG. 6 that the transverse grooves 23 extend over the inwardly bent ends 34, 35 of the sheet metal strip 28 in a downstream direction so that the flow of the cooling medium is assured out of the cooling passages formed by the grooves 23 into the hollow space 31 of the blade 20.

Therebeyond, there exists the possibility also with the type of construction of a turbine blade illustrated in FIG. 6, to insert the strip 28 serving to form the insert, into the hollow space or cavity 31 of the blade 20 only when the sheet metal strip 21 serving to form the blade wall, has already been deformed.

Figure 9:
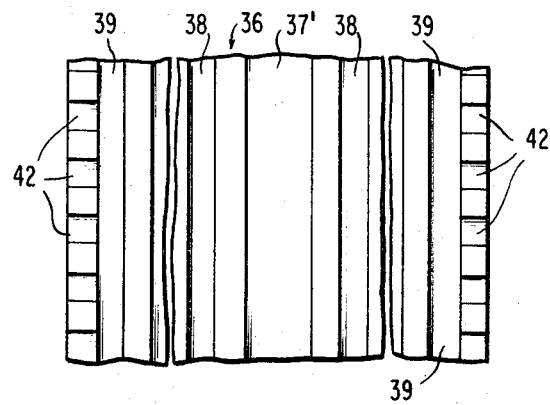
FIG. 9 is a partial plan view of a sheet metal strip provided with grooves to provide the blade wall associated with the turbine blade according to FIG. 11.
Figure 10:
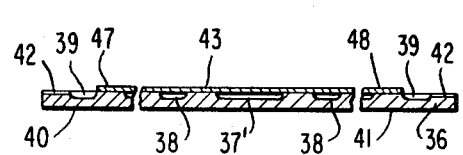
FIG. 10 is a cross-sectional view of the sheet metal strip according to FIG. 9 including a thin sheet metal strip serving to cover the grooves.

FIGS. 9 and 10 illustrate a sheet metal strip 36 provided with vertical grooves. The vertical groove 37' thereby serves for the cooling of the blade leading edge (not shown) of a turbine blade 37 according to FIG. 11 whereas the vertical grooves 38 serve for the cooling of the lateral walls of the blade. The vertical grooves 39, within the area of the ends 40, 41 of the sheet metal strip 36, terminate in the transverse grooves 42.

The thinner sheet metal strip 43 which can be seen from FIG. 10 and which is welded or brazed to the strip 36, covers the grooves 37 and 38 whereby these grooves 37, 38 form cooling passages separate from one another already prior to the deformation of the two sheet metal strips 36, 43.

Figure 11:
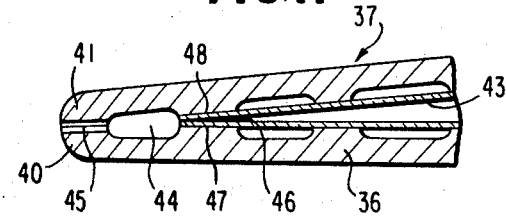
FIG. 11 is a partial cross-sectional view of a third embodiment of a turbine blade made in accordance with the present invention.

As can be further seen from FIG. 10, the thinner sheet metal strip 43 terminates at the inwardly disposed edges of the grooves 39 so that after completed deformation of the two strips 36, 43 into the blade configuration according to FIG. 11, the grooves 39 form a common vertical cooling passage 44. Of the transverse grooves 42 in communication with the cooling channel or passage 44, two respective opposite grooves form common transverse passages 45 (FIG. 11) as a result of the abutment of the two ends 40 and 41 of the sheet metal strip 36, for discharging the cooling medium out of the cooling passage 44 by way of the trailing edge of the blade 37. In the longitudinal direction of the blade, at the place indicated by reference numeral 46 (FIG. 11), the inwardly facing edges 47, 48 of the thinner sheet metal strip 43 are brazed or welded together.

Figure 12:
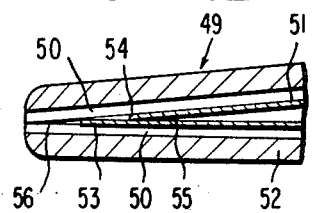
FIG. 12 is a partial cross-sectional view of a fourth embodiment of a turbine blade made in accordance with the present invention.

FIG. 12 illustrates the rear end of a turbine blade 49, made according to the present invention as a variation of the embodiment according to FIGS. 1 to 5 in that the thinner sheet metal strip 51 serving the purpose of covering the grooves and therewith of forming the cooling passages 50, is shorter than the sheet metal strip 52 serving to form the blade wall and provided with the grooves 50 whereby the ends 53, 54 of the thinner sheet metal strip, after the deformation into the configuration according to FIG. 12, abut, mutually offset, against one another in front of the blade trailing edge and are brazed or welded together over the entire height of the blade 49 at the place 55. Further brazing or welding joints 56 may be provided for connecting the ends of the sheet metal strip 52 between respective cooling passages 50.

The present invention is further applicable to turbine blades to be cooled whose cooling passages are provided with mutually differing flow cross sections, arranged one above the other or adjacent one another, in order to achieve a uniform blade wall temperature. Furthermore, the present invention is applicable to turbine blades which have curved or helically shaped cooling passages, differing from the rectilinear shape of the cooling passages.

Therebeyond, the present invention is also applicable to turbine blades in which only the cooling passages are supplied with the cooling medium, i.e., a cooling medium supply of the passages is not to take place by way of the interior hollow space or cavity of the blade.

As to the rest, air tapped in a conventional manner from the compressor of a gas turbine unit (not shown) may be used as cooling medium for the embodiments of the turbine blades according to FIGS. 1, 6, 11 and 12.

While I have shown and described several embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are within the scope of those skilled in the art.

I claim:

1. A method for the manufacture of a turbine blade which is constructed hollow on the inside for the purpose of cooling the blade walls thereof by means of a cooling medium and which is provided with cooling passages, supplied with cooling medium that is discharged by way of aperture means located near the trailing edge of the blade, characterized by the steps of, at first, preparing a sheet metal strip corresponding to the developed blade to serve as blade wall, thereafter working grooves into the sheet metal strip, attaching a further, thinner sheet metal strip to the side of the first-mentioned sheet metal strip provided with the grooves by brazing or welding to form cooling passages between the two strips, placing the blade wall consisting of the assembled first-mentioned strip and the further metal strip about a tool core to produce the desired blade profile in such a manner that the two ends of the blade wall abut against one another to form the trailing edge of the blade, and connecting said two ends of the blade wall with each other within the area of the abutting ends thereof.

2. A method according to claim 1, wherein the turbine blade is a guide blade.

3. A method according to claim 1, wherein the grooves extend in the axial direction.

4. A method according to claim 1, wherein the grooves extend in the radial direction.

5. A method according to claim 1, characterized in that the cooling medium is supplied to the cooling passages from the outside.

6. A method according to claim 1, characterized in that the cooling medium is supplied to the cooling passages by way of the hollow space of the blade.

7. A method according to claim 1, characterized in that several aperture means are formed at the trailing edge of the blade.

8. A method according to claim 1, characterized in that the further sheet metal strip is of substantially the same size as the first-mentioned strip.

9. A method according to claim 1, characterized in that the ends of the blade wall forming the blade trailing edge are connected with each other by brazing or welding.

10. A method according to claim 1, characterized in that the further thinner sheet metal strip, prior to its connection with the first-mentioned sheet metal strip provided with the grooves, is provided already with bores which enable the cooling air supply from the interior hollow space of the blade to the cooling passages formed by the grooves.

11. A method according to claim 1, characterized in that the further, thinner sheet metal strip is shorter than the first-mentioned sheet metal strip provided with the grooves so that with the use of radial grooves worked into the blade wall and after completed deformation of both strips, the ends of the further thinner sheet metal strip terminate in front of at least one cooling passage formed by the grooves of the blade wall and are connected thereat with each other.

12. A method according to claim 1, characterized in that with the use of grooves worked into the first-mentioned sheet metal strip in the axial direction, these grooves extend only over sections of this strip and are so arranged one above the other that after completed deformation of this strip corresponding to the desired blade contour, these grooves are disposed within the area of at least one of the two edges consisting of leading and trailing edge of the blade, and in that thin sheet metal strips, in lengths according to the axial extent of the grooves, are attached to the sections provided with the grooves of the first-mentioned sheet metal strip for the purpose of forming the cooling passages.

13. A method according to claim 12, characterized in that the further, thinner sheet metal strip is shorter than the first-mentioned sheet metal strip provided with the grooves so that with the use of radial grooves worked into the blade wall and after completed deformation of both strips, the ends of the further thinner sheet metal strip terminate in front of at least one cooling passage formed by the grooves of the blade wall and are connected thereat with each other.

14. A method according to claim 1, characterized in that at least one further, shorter sheet metal strip serving to cover the grooves arranged section-wise in the first-mentioned sheet metal strip of the blade wall is so attached to said first-mentioned sheet metal strip by means of upwardly bent ends of said shorter strip which extend approximately parallel to the two lateral edges of the first-mentioned sheet metal strip, that after completed deformation, the upwardly bend ends of a shorter sheet metal strip overlap, whereupon the overlapping ends are securely connected with each other.

15. A method according to claim 1, characterized in that with the use of grooves extending either in the radial or axial direction, the further, thinner sheet metal strip, serving to cover the grooves, is shorter than the first-mentioned sheet metal strip by such an amount that after completed deformation of both strips corresponding to the desired blade contour, one or more of the grooves within the area of the blade trailing edge will form one or more of the cooling passages provided with bores or slots which, for purposes of discharging the cooling air out of the cooling passages by way of the blade trailing edge, are worked into the blade wall simultaneously with the grooves prior to deformation of the blade wall.

16. A method according to claim 1, characterized in that the further, thinner sheet metal strip, prior to its connection with the first-mentioned sheet metal strip provided with the grooves, is provided already with bores which enable the cooling air supply from the interior hollow space of the blade to the cooling passages formed by the grooves.

17. A method according to claim 1, wherein said grooves are so located in the sheet metal strip and said thinner sheet metal strip is of such size that both of the opposing surfaces of the finished turbine blades are accessible to the cooling medium.

* * * * *